(12) United States Patent
Huncovsky

(10) Patent No.: US 7,396,060 B2
(45) Date of Patent: Jul. 8, 2008

(54) PIPE PULLING DEVICE

(76) Inventor: Jeffery W. Huncovsky, 1739 Highway 19, Hermann, MO (US) 65041

( * ) Notice: Subject to any disclaimer, the term of this patent is extended or adjusted under 35 U.S.C. 154(b) by 330 days.

(21) Appl. No.: 11/184,669

(22) Filed: Jul. 18, 2005

(65) Prior Publication Data
US 2006/0018717 A1    Jan. 26, 2006

Related U.S. Application Data

(60) Provisional application No. 60/589,745, filed on Jul. 20, 2004.

(51) Int. Cl.
*B66C 1/56* (2006.01)
(52) U.S. Cl. .......................................... 294/96
(58) Field of Classification Search ............. 294/94–96, 294/86.12, 86.25, 102.1; 81/443–446
See application file for complete search history.

(56) References Cited

U.S. PATENT DOCUMENTS

| | | | |
|---|---|---|---|
| 991,176 A | 5/1911 | Speer | |
| 1,123,615 A | 1/1915 | Stewart | |
| 1,590,280 A | 6/1926 | Buchanan | |
| 2,114,988 A | 4/1938 | Anthony | |
| 2,594,429 A * | 4/1952 | Handley | 294/96 |
| 2,781,222 A | 2/1957 | Smith | |
| 3,490,793 A * | 1/1970 | Wagner | 285/93 |
| 3,709,546 A * | 1/1973 | Vaughan | 294/96 |
| 3,854,768 A | 12/1974 | King | |
| 5,094,496 A | 3/1992 | King | |
| 5,597,192 A * | 1/1997 | Smith | 294/96 |
| 5,671,953 A * | 9/1997 | Brewis et al. | 285/258 |
| 5,988,719 A * | 11/1999 | Lavender | 294/96 |
| 6,360,636 B1 * | 3/2002 | Elftmann | 81/445 |
| 2002/0185879 A1 * | 12/2002 | Edwards | 294/96 |

* cited by examiner

*Primary Examiner*—Dean J. Kramer
(74) *Attorney, Agent, or Firm*—Paul M. Denk

(57) ABSTRACT

A pipe pulling device secures to the end of a pipe, with wedge action, for pulling by equipment. The device has a shaft, a housing upon the shaft, one or more wedges, a cone, nuts, eye nuts, O rings, and a sleeve, all arranged coaxially. First the nut is placed upon the shaft, then the housing is oriented forward. The forward end of the housing has a beveled edge to assist in passage through soil. The contractor then places a wedge of three vanes upon the shaft within the housing. A hollow cone upon the shaft contacts the wedge. An eye nut then secures the assembled parts upon the shaft. In use, a contractor tightens the nut rearward thus pulling the cone forward and expanding the wedge. The Is wedge expands to grasp the pipe between the housing and the wedge. The contractor can then pull the pipe through soil.

10 Claims, 3 Drawing Sheets

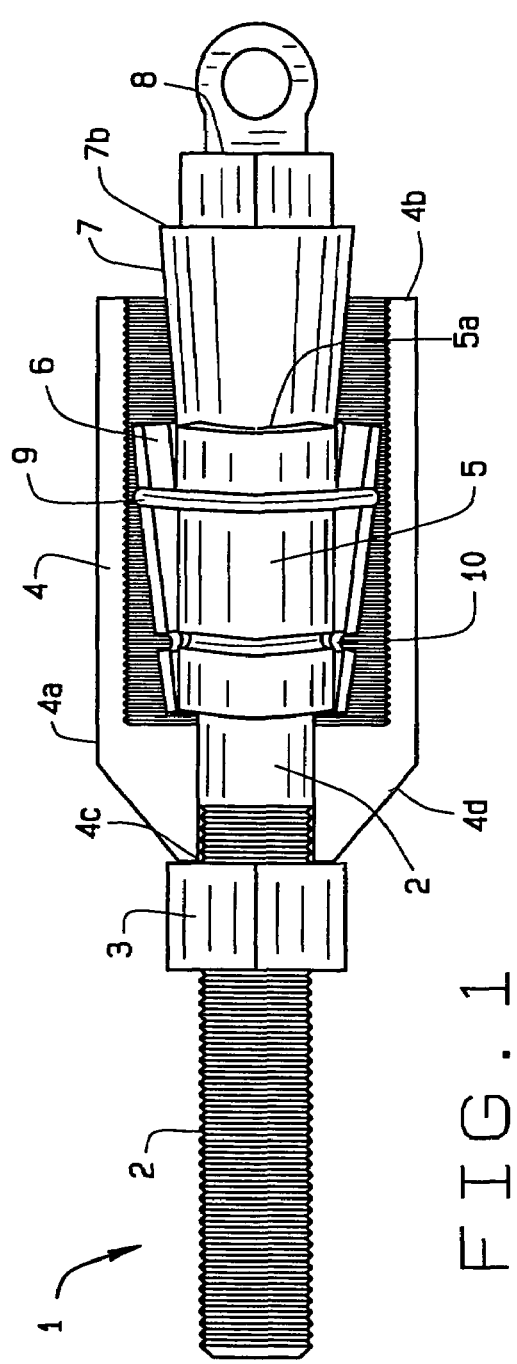
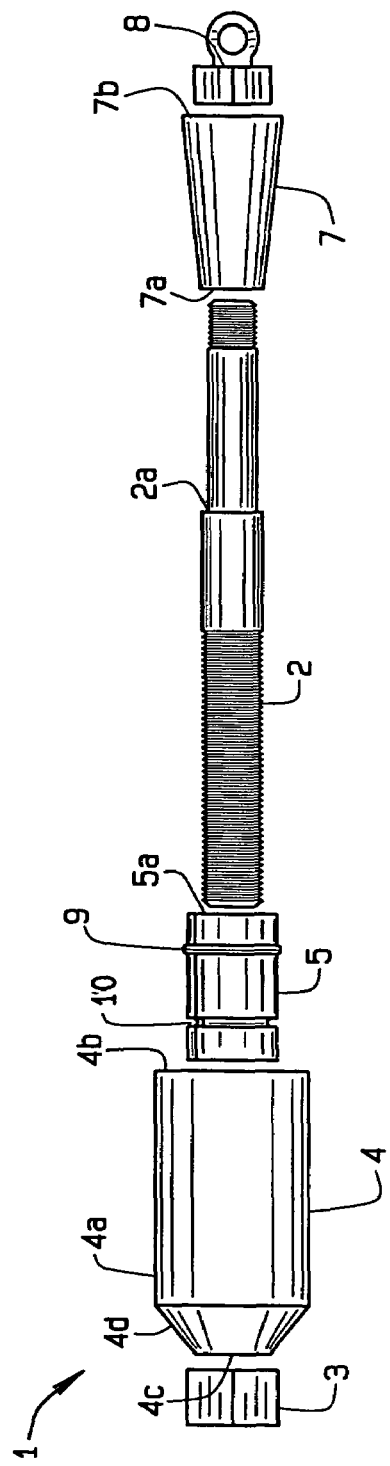

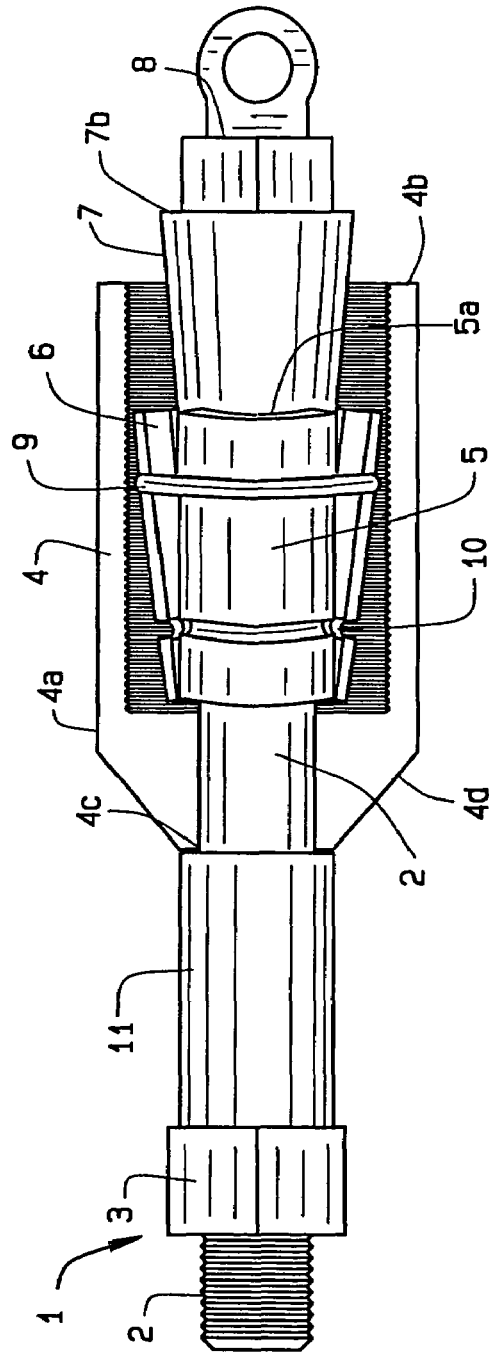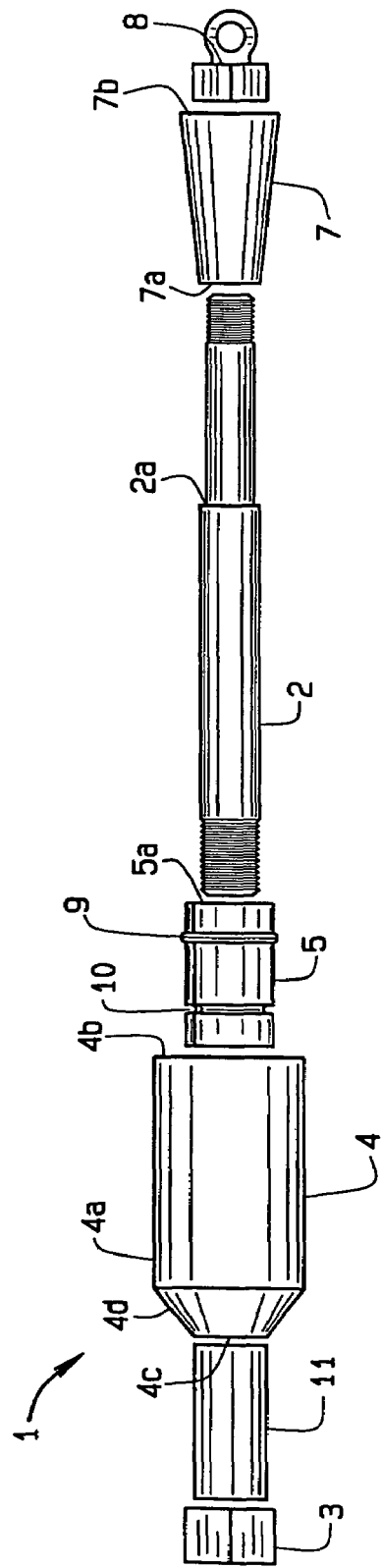
FIG. 3
FIG. 4

PIPE PULLING DEVICE

CROSS REFERENCE TO RELATED APPLICATION

This nonprovisional patent application claims priority to the provisional patent application having Ser. No. 60/589,745, which was filed on Jul. 20, 2004.

BACKGROUND OF THE INVENTION

The pipe pulling device relates to entrenching equipment in general and more specifically to connecting plastic pipe to a pulling machine. Plastic pipe fits within a housing and one or more wedges fit within the plastic pipe. Advancing a shaft within the pipe and through the wedges compresses the pipe between the wedges and the housing. Pulling on the shaft then pulls the pipe through the soil for entrenching.

Contractors, utilities, and earthmovers have entrenched pipe, cable, and lines across the land. Buried lines leave a clean landscape and have less disruption to the utilities located within the buried line and on easements. Buried lines suffer less from vandals and the elements. Contractors have dug trenches and then buried lines within the trench, piled earth upon lines, plowed lines, or bored into soil. Particularly in the utility and irrigation industries, contractors use a plow like or boring implement to draw pipe to a desired depth in the soil and then to pull the pipe through the soil to the desired destination. In the electric, telephone, and cable television industries, contractors entrench the pipe containing a cord. The cord and the pipe attach to a pulling device. Once the pipe reaches the desired depth and location, the contractor ties the desired cable to the cord and pulls the cord through the length of the pipe.

Plastic pipe has a homogeneous composition with a low coefficient of friction, or slick surface. Contractors pull plastic pipe readily through the soil with little resistance. To pull pipe, contractors grasp the pipe with a variety of existing devices. The devices encounter the slick surface of the pipe and slip off the pipe during pulling. Devices have grasped the pipe wall in jaws or crushed the pipe to get a strong grip to withstand a pull through soil.

DESCRIPTION OF THE PRIOR ART

Pipe pullers are known in the prior art for years. Older pipe pullers grasped the pipe with jaws, slipped a socket around the pipe, and nested the pipe within one way fins.

The patent to King, No. 5,094,496 shows a pipe pulling device relative to the present invention. First, the present invention expands three vanes as a wedge, connected at the tip, by advancing a nut upon the shaft and by pulling of the shaft. Advancing the nut moves the cone forward and displaces the wedge vanes outward to compress a pipe between the vanes and the housing. Pulling of the shaft also moves the cone forward and displaces the wedge vanes outwardly. Meanwhile, the King '496 puller displaces separate wedges by a hammer blow to the housing and by pulling on the shaft. A hammer blow upsets the housing backward which tips the wedges to grasp the pipe. Pulling on the shaft advances the housing forward and causes the wedges to grip the inside of the pipe. Second, the present invention's wedge lacks the fixed housing of King's '496 puller. The '496 puller has separated wedges arrayed around a fixed housing through which the pulling shaft passes. The fixed housing has a tapered forward section to assist in tipping the wedges to grasp the pipe. However, the present invention has a cone for spreading the wedge vanes. The cone advances through the wedge expanding the vanes outward. Third, King's '496 patent, especially claim 1, requires a strike by a hammer to set the wedges upon the housing. The differential movement of the shaft upon striking the housing sets the wedges to grasp the pipe. However, the present invention omits a hammer strike as it sets the wedge vanes mechanically by turning a nut to gradually advance the cone forward. Further, the present invention has a bevel upon the tip of the housing as a deterrent to hammer strikes.

Also, the patent to King, No. 3,854,768, shows a pipe pulling device in an expired patent. This patent focuses upon pulling tubes for a water sprinkler system. The sprinkler tube fits within a toothed holding member having a flared end. The flared end fits within a flared housing. Upon pulling the housing, the flared shapes of the housing and holding member compress the tube and engage the teeth into the tube.

The patent to Speer, No. 991,176, shows a slip socket with spring biased opposing jaws that grasp a pipe and permit the handle to release a tool and the operator to reuse the tool. The jaws of the slip socket grasp the outside of the pipe wall.

The patent to Stewart, No. 1,123,615, shows a combined sucker rod and socket. The rod advances through a concentrically flanged slip and then a spring. The socket contains a spring that compresses the slip causing the flanges to tightly grasp the rod.

The patent to Buchanan, No. 1,590,280, shows a chuck that grasps a pipe within four jaws. A spring upon a handle compresses the jaws backward towards the pipe. The jaws grasp a pipe upon an internal stem so the chuck can lift or pull a pipe.

Then the patent to Anthony, No. 2,114,988, shows another slip socket akin to Stewart's '615. This slip socket has a barrel of concentric toothed flanges for gripping a pipe. A spring presses down the barrel tightening the grip of the socket upon a pipe.

The patent to Smith, B., No. 2,781,222, shows a slip socket releaser that releases some of the previously described tools from pipe. The releaser applies downward force upon a supported pipe that causes the jaws to drop and expand, releasing the pipe.

While the above-described devices fulfill their respective, particular objectives and requirements, the aforementioned patents do not describe a pipe pulling device that grasps a pipe without a hammer strike. Therefore, a need exists for a new and improved pipe pulling device that can be used for mechanically grasping the inner and outer walls of plastic pipe. In this regard, the present invention substantially fulfills this need. Further, the pipe pulling device according to the present invention substantially departs from the conventional concepts and designs of the prior art, and in doing so provides a device primarily developed for the purpose of grasping a pipe between vanes of a wedge and a housing securely prior to pulling of the pipe. It does this without impairing the surface of the end of the pulled pipe.

SUMMARY OF THE INVENTION

Generally, the present invention provides a pipe pulling device that secures to the end of a pipe with wedge action. The device comprises a shaft, a housing upon the shaft, one or more wedges upon the shaft and within the housing, a cone within the wedges, nuts, eyenuts, O rings, and a sleeve. A contractor pulls the present invention through the soil, pulling pipe behind it. The direction of pull is denoted forward in references to the present invention, generally opposite the pipe. The contractor places a nut upon the shaft at the forward end. Against the nut, an optional sleeve is placed upon the shaft. Then the housing is placed upon the shaft, oriented forward. The forward end of the housing has a beveled edge to substantially assist in passage of the device through the soil and to provide a channel for the pipe to be pulled through. The contractor then places a wedge of three vanes upon the shaft within the housing. One or more O rings secure the vanes together. The contractor next places a hollow cone upon the shaft with the narrow end of the cone within the wedge. Lastly, the contractor installs an eye nut upon the shaft, securing the assembled parts upon the shaft. In use, the contractor ties a pull cord to the eye nut then places the end of a pipe within the housing and around the wedge vanes. The contractor then tightens the nut rearward thus pulling the cone forward and expanding the wedge. The wedge expands to grasp the pipe between the housing and the wedge. The contractor does a test pull of the device and tightens the nut further if necessary. After use, the contractor loosens the nut to remove the present invention from the entrenched pipe.

Numerous objects, features and advantages of the present invention will be readily apparent to those of ordinary skill in the art upon a reading of the following detailed description of presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a new and improved pipe pulling device from rugged parts.

Another object is to provide such a device that is easy to assemble.

Another object is to provide such a device and component parts made from materials to minimize cost.

Another object is to provide such a device shaped for passage through soil.

Another object is to provide a housing and wedge that grasp a pipe without need of a hammer to set the housing.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

FIG. 1 shows a partial section view of the preferred embodiment of the pipe pulling device assembled in accordance with the principles of the present invention;

FIG. 2 shows an exploded view of the preferred embodiment particularly the shaft of the pipe pulling device;

FIG. 3 shows a partial section view of an alternate embodiment of the present invention with a sleeve;

FIG. 4 shows an exploded view of an alternate embodiment particularly the sleeve and the shaft of the present invention;

The same reference numerals refer to the same parts throughout the various figures.

DESCRIPTION OF THE PREFERRED EMBODIMENT

Figure 5:
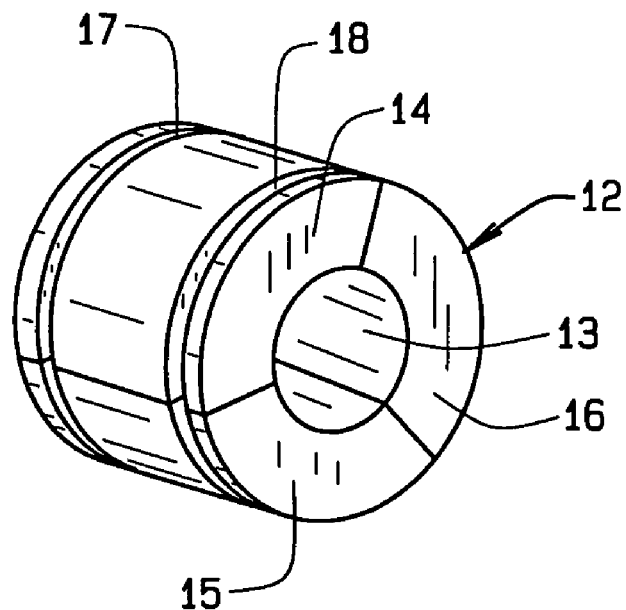
FIG. 5 shows an isometric view of a variation of the expansion sleeve.

The present art overcomes the prior art limitations by providing wedge vanes that expand under mechanical action to grasp a pipe within a housing. A contractor pulls the present invention through the soil, pulling pipe behind it. The direction of pull is denoted forward in references to the present invention, generally opposite the pipe. Beginning on FIG. 1, the preferred embodiment of the pipe pulling device 1 has a shaft 2, a nut 3 upon the shaft 2, an housing 4 upon the shaft 2 and rearward of the nut 3, a wedge 5 upon the shaft 2 and within the housing 4, a cone 7 upon the shaft 2 and advancing into the wedge 5, and an eye nut 8 upon the shaft 2 and behind the cone 7. The shaft 2, generally cylindrical steel, has threading for the nut 3 at the front and the eye nut 8 at the rear. The shaft 2 generally exceeds the housing 4 in length with at least two nut 3 diameter's length of threading on the front for connecting with pulling equipment such as a plow, tractor, or bulldozer. The nut 3 has matching threads to the shaft 2, six or more sides, and steel construction.

Behind the nut 3, the housing 4 has a generally hollow steel cylindrical shape with a central unthreaded hole 4c through the front 4a to admit the shaft 2. In an alternative embodiment, the central hole 4c of the housing 4 has threads. The front 4a of the housing 4 has a bevel 4d to ease passage of the housing 4 through soil and deflect strikes against the housing 4. The bevel 4d extends around the entire perimeter of the housing 4 with the narrow part of the bevel towards the front 4a. Opposite the front 4a, the housing 4 has an open rear 4b that admits the end of a pipe. The housings 4 vary in diameter to correspond with different pipe diameters. In the preferred embodiment within the rear 4b, the housing 4 has threading upon the inner perimeter for the depth of the housing 4 from the rear 4b to near the front 4a. The threading grasps the outer surface of an inserted pipe.

Within the housing 4 and upon the shaft 2, the wedge 5 has a generally cylindrical shape formed of one or more vanes 6. In the closed position (see FIG. 2), the vanes 6 contact one another to encircle the shaft 2. The vanes 6 have one or more circumferential grooves 10 to seat O rings 9. The O rings 9 secure the vanes 6 together in a generally circular shape with a central aperture 5a through which the shaft 2 passes. The O rings 9 are generally rubber or other resilient material. To expand the vanes 6, a cone 7 travels upon the shaft 2. The cone 7 is frusto-conical in shape with a central hole for the shaft 2. The narrow end 7a of the cone 7 advances upon the shaft 2 to the wedge 5 towards the front of the present invention 1. The narrow end 7a of the cone 7 then enters the aperture 5a of the wedge 5 and expands the vanes 6 as the shaft 2 draws forward. Upon the wide end 7b of the cone 7, an eye nut 8 secures to the shaft 2. The eye nut 8 has six sides for turning and a generally circular eye extending perpendicular to the face of the eye nut 8.

Next, FIG. 2 shows the separate parts of the preferred embodiment of the present invention. The parts identified in FIG. 1 have a generally coaxial relationship upon the shaft 2. After the nut 3 and the housing 4, the present invention has a wedge 5. In FIG. 2, the wedge 5 has its closed position with the vanes 6 together. The wedge 5 has a generally cylindrical shape with a central aperture 5a to admit the shaft 2. The shaft 2 has threading with more upon the front than the rear. The threading on the front extends beyond the housing 4 to attach the present invention to pulling equipment. The shaft 2 then has a step 2a in diameter with the rear slightly less in diameter than the front. The larger diameter fits through the central hole in the housing 4 while the smaller diameter fits the hole of the cone 7. The diameter step 2a stops the cone 7 from advancing and provides the maximum expansion of the vanes 6. After the step 2a, the preferred embodiment continues with the cone 7 and the eye nut 8.

In FIG. 3 an alternate embodiment of the pipe pulling device 1 has a shaft 2, a nut 3 upon the shaft 2, a sleeve behind the nut 3, an housing 4 upon the shaft 2 and rearward of the sleeve, a wedge 5 upon the shaft 2 and within the housing 4, a cone 7 upon the shaft 2 and advancing into the wedge 5, and an eye nut 8 upon the shaft 2 and behind the cone 7. The shaft 2, generally cylindrical steel, has threading upon both ends for the nut 3 at the front and the eye nut 8 at the rear. The shaft 2 generally exceeds the housing 4 in length with at least two nut 3 diameter's length of threading on the front for connecting with pulling equipment such as a plow, tractor, or bulldozer. The nut 3 has matching threads to the shaft 2, six or more sides, and steel construction. Behind the nut 3, the sleeve rests upon the shaft 2. The steel sleeve has a generally hollow steel cylindrical shape. The outer diameter of the sleeve is less than the width of the nut 3 and approximately that of the front of the housing 4.

Behind the sleeve, the housing 4 has a generally hollow steel cylindrical shape with a central unthreaded hole 4c through the front 4a to admit the shaft 2. In an alternative embodiment, the central hole 4c of the housing 4 has threads. The front 4a of the housing 4 has a bevel 4d to ease passage of the housing 4 through soil and deflect strikes against the housing 4. The bevel 4d extends around the entire perimeter of the housing 4 with the narrow part of the bevel towards the front 4a. Opposite the front 4a, the housing 4 has an open rear 4b to admit the end of a pipe. The housings 4 vary in diameter to correspond with different pipe diameters. In the preferred embodiment within the rear 4b, the housing 4 has threading upon the inside surface for the depth of the housing 4 from the rear 4b to near the front 4a. The threading grasps an inserted pipe.

Within the housing 4 and upon the shaft 2, the wedge 5 has a generally cylindrical shape formed of one or more vanes 6. In the closed position (see FIG. 4), the vanes 6 contact one another to encircle the shaft 2. The vanes 6 have one or more circumferential grooves 10 to seat O rings 9. The O rings 9 secure the vanes 6 together in a generally circular shape with a central aperture 5a through which the shaft 2 passes. The O rings 9 are generally rubber or other resilient material. To expand the vanes 6, a cone 7 travels upon the shaft 2. The cone 7 is frusta-conical in shape with a central hole for the shaft 2. The narrow end 7a of the cone 7 advances upon the shaft 2 to the wedge 5 towards the front of the present invention. The narrow end 7a of the cone 7 enters the aperture 5a of the wedge 5 and expands the vanes 6 as the shaft 2 draws forward. Upon the wide end 7b of the cone 7, an eye nut 8 secures to the shaft 2. The eye nut 8 has six sides for turning and a generally circular eye extending perpendicular to the face of the eye nut 8.

Next, FIG. 4 shows the separate parts of an alternate embodiment of the present invention. The parts identified in FIG. 3 have a generally coaxial relationship upon the shaft 2. After the nut 3, the sleeve, and the housing 4, the present invention has a wedge 5. In FIG. 4, the wedge 5 has its closed position with the vanes 6 together. The wedge 5 has a generally cylindrical shape with a central aperture 5a to admit the shaft 2. The shaft 2 has threading with more threading upon the front than the rear. The threading on the front extends well beyond the housing 4 to attach the present invention to pulling equipment. The shaft 2 then has a step 2a in diameter with the rear slightly less in diameter than the front. The larger diameter fits through the central hole in the housing 4 while the smaller diameter fits the hole of the cone 7. The diameter step 2a stops the cone 7 from advancing and provides the maximum expansion of the vanes 6. After the step 2a, the preferred embodiment continues with the cone 7 and the eye nut 8 as hereinbefore described.

FIG. 5 shows a further alternative embodiment where the wedge is rather cylindrical in appearance, as noted at 12, and also has the centrally cavity 13 provided therethrough. The wedge is made up of three components, as can be seen at 14, 15 and 16. And, there are grooves 17 and 18 provided circumferentially around their outer surface, and into which the elastic O-rings, such as shown at 9, may locate, to generally compress the sections together, until such time as they are wedged into expansion. This occurs when the cone shape member 7 engages within the cavity, to cause an expansion of the wedge sections.

Figure 6:
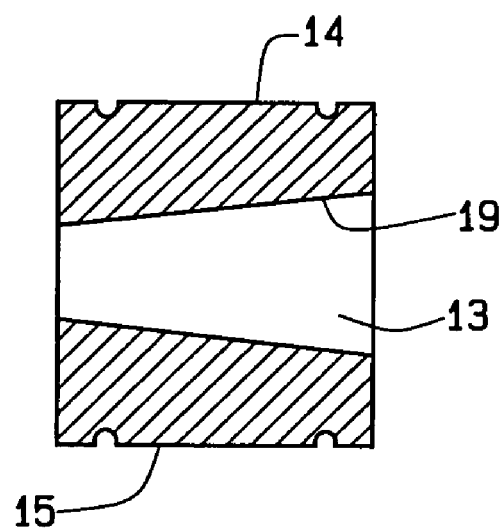
FIG. 6 provides a sectional view through the sleeve showing the tapering central cavity.

As can be seen in FIG. 6, the wedge section, and more specifically its central cavity 13, is likewise contoured, being rather cone shaped itself, as can be seen at 19, so that when the cones 7 fits therein, and is compressed and pulled tightly into the cavity, through a tightening of the nut 3 upon the threaded shaft 2, the wedge sections will expand uniformly along their length, to provide for a biasing and wedging of the wedge sections against any pipe provided therein, and biased it against the circumferential grooves 10, provided within the housing 4, to secure the pipe end therein, in preparation for its pulling through the ground, other pipe, or the like.

In use, a contractor prepares pulling equipment such as a plow, bulldozer, or tractor and a lead length of pipe. The contractor runs pulling cord through the pipe and ties the pull cord to the eye nut 8. The contractor tightens the eye nut 8 to secure the present invention. Then the contractor pushes the end of a pipe within the housing 4 and around the vanes 6. The contractor then tightens the nut 3 rearward, thus pulling the cone 7 forward and expanding the wedge 5. The expanding wedge 5 grasps the pipe between the housing 4 and the wedge 5. The contractor does a test pull of the device 1 and tightens the nut 3 further if necessary. The contractor then pulls the present invention 1 through soil with the pipe trailing behind. After use, the contractor loosens the nut 3 to remove the present invention 1 from the entrenched pipe.

From the aforementioned description, a pipe pulling device has been described. The pipe pulling device is uniquely capable of securing an end of a pipe within a housing by a wedge of three or more vanes, depending upon the pipe diameter, advanced mechanically inside of the end of the pipe. The pipe pulling device and its various components may be manufactured from many materials including but not limited to rubber, high density polyethylene HDPE, polypropylene PP, polyethylene terephalate ethylene PETE, nylon, ferrous and non-ferrous metals, their alloys, and composites.

The phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A pipe pulling device that grasps the end of a pipe comprising:
    a shaft;

said shaft has a front with threading over one-third the length of said shaft and an opposite rear of lesser diameter with threading over less that one-quarter the length of said shaft;

a nut upon said shaft;

a housing behind said nut and upon said shaft;

a wedge having one or more vanes arranged about a central aperture, upon said shaft and within said housing;

a truncated cone upon said shaft having a narrow end and an opposite wide end with said narrow end within said aperture; and, an eye nut upon said shaft opposite said nut and proximate to said wide end of said cone, whereby said end of said pipe is inserted within said housing and over said wedge and said nut is turned to advance said cone to expand said wedge against said pipe thus grasping said end of said pipe for pulling.

2. The pipe pulling device of claim 1 wherein said wedge has a generally cylindrical shape of three or more vanes held by one or more O rings within one or more circumferential grooves in said vanes.

3. The pipe pulling device of claim 2 further comprising:

said housing having a front and an opposite rear, a generally hollow cylindrical shape having threading upon the interior of said housing, a central hole to admit said shaft, said front having a bevel where the narrow part of said bevel faces in the direction of pipe pulling.

4. The pipe pulling device of claim 3 further comprising:

a sleeve having a generally hollow cylindrical shape located upon said shaft behind said nut and ahead of said housing.

5. The pipe pulling device of claim 2 wherein each of said vanes occupy one third of the circumference of said wedge.

6. The pipe pulling device of claim 1 wherein the housing has a bevel at its front end.

7. The pipe pulling device of claim 1 wherein the central aperture of the wedge is cone shaped.

8. The pipe pulling device of claim 7 wherein said cone shaped central aperture of the wedge has a bevel similar to the shape of the truncated cone, to allow for the wedge to expand uniformly along its length as the nut is turned to advance the cone to expand the wedge against a pipe.

9. The pipe pulling device of claim 1 and including means to secure said cone and said shaft;

said securing means having one or more nuts upon said shaft and outside said housing and said cone.

10. A method to secure a puller to the end of a pipe, comprising:

a) placing a nut upon a threaded shaft;

b) placing a housing upon said shaft adjacent to said nut;

c) inserting a three vaned wedge upon said shaft and within said housing;

d) placing a cone within said wedge to expand said vanes;

e) tightening an eye nut upon said shaft opposite said cone to secure the assembled parts;

f) inserting a pipe over said wedge and within said housing; and, g) tightening said nut to draw said cone towards and through said wedge;

whereby, said cone expands said vanes outwards securing said pipe to said housing for pulling.

* * * * *